United States Patent
Dyszlewski et al.

(10) Patent No.: US 11,129,388 B2
(45) Date of Patent: Sep. 28, 2021

(54) SOLID HERBICIDAL CONCENTRATE COMPOSITIONS

(71) Applicant: Monsanto Technology LLC, St. Louis, MO (US)

(72) Inventors: Andrew D. Dyszlewski, Creve Coeur, MO (US); Todd C. Friedman, Arnold, MO (US); Phillip K. Lee, St. Charles, MO (US); Alison MacInnes, Wildwood, MO (US)

(73) Assignee: Monsanto Technology LLC, St. Louis, MO (US)

( * ) Notice: Subject to any disclaimer, the term of this patent is extended or adjusted under 35 U.S.C. 154(b) by 62 days.

(21) Appl. No.: 16/324,440

(22) PCT Filed: Aug. 9, 2017

(86) PCT No.: PCT/US2017/046012
§ 371 (c)(1),
(2) Date: Feb. 8, 2019

(87) PCT Pub. No.: WO2018/031610
PCT Pub. Date: Feb. 15, 2018

(65) Prior Publication Data
US 2019/0208787 A1 Jul. 11, 2019

Related U.S. Application Data

(60) Provisional application No. 62/372,586, filed on Aug. 9, 2016.

(51) Int. Cl.
| | | |
|---|---|---|
| *A01N 57/20* | (2006.01) | |
| *A01N 37/40* | (2006.01) | |
| *A01N 31/00* | (2006.01) | |
| *A01N 25/00* | (2006.01) | |
| *A01N 25/22* | (2006.01) | |

(52) U.S. Cl.
CPC ............ *A01N 57/20* (2013.01); *A01N 25/00* (2013.01); *A01N 25/22* (2013.01); *A01N 31/00* (2013.01); *A01N 37/40* (2013.01)

(58) Field of Classification Search
None
See application file for complete search history.

(56) References Cited

U.S. PATENT DOCUMENTS

| | | |
|---|---|---|
| 4,140,513 A | 2/1979 | Prill |
| 5,939,584 A | 8/1999 | Merkle et al. |
| 6,410,783 B1 | 6/2002 | Peterson et al. |
| 6,605,568 B1 | 8/2003 | Massmann et al. |
| 6,734,142 B2 | 5/2004 | Massmann et al. |
| 7,008,904 B2 | 3/2006 | Corckett et al. |
| 9,265,258 B2 | 2/2016 | Unger |
| 2005/0037924 A1 | 2/2005 | Massmann et al. |
| 2011/0041952 A1 | 2/2011 | Gaultney |
| 2014/0128264 A1 | 5/2014 | Hemminghaus et al. |
| 2014/0249026 A1 | 9/2014 | Hemminghaus et al. |
| 2015/0150247 A1 * | 6/2015 | Wacker ............... A01N 25/30 504/127 |
| 2015/0164082 A1 | 6/2015 | Macinnes |

FOREIGN PATENT DOCUMENTS

| | | | |
|---|---|---|---|
| CN | 101695298 B | 10/2012 | |
| CN | 102870803 A | 1/2013 | |
| CN | 101186622 B | 3/2013 | |
| CN | 104472532 A | 4/2015 | |
| CN | 103461331 B | 5/2015 | |
| CN | 104592014 A | 5/2015 | |
| DE | 102012002272 A1 * | 8/2013 | ............. A01N 25/30 |
| EP | 258325 B1 | 6/1990 | |
| EP | 0577914 A1 | 1/1994 | |
| WO | 8704595 A1 | 8/1987 | |
| WO | 1996020155 A1 | 7/1996 | |
| WO | 2002032845 A2 | 4/2002 | |
| WO | 2003013241 A1 | 2/2003 | |
| WO | 2004103076 A1 | 2/2004 | |
| WO | 2004019684 A2 | 3/2004 | |
| WO | WO-2010020599 A2 * | 2/2010 | ............. A01N 25/30 |
| WO | 2013184622 A2 | 12/2013 | |
| WO | 2014071374 A2 | 5/2014 | |

OTHER PUBLICATIONS

Kim, M., et al., "A Simplified Approach to the Determination of N-Nitroso Glyphosate in Technical Glyphosate Using HPLC with Post-Derivatization and Colorimetric Detection," 2007, Talanta, 72:1054-1058, 5 pages.
Analysis of N-Nitroso Glyphosate in Glyphosate Samples, LCGA, Downloaded Oct. 1, 2015, http://webcache.googleusercontent.com/... ch?q=cache:8CUETWf31bgJ:www.chromatographyonline.com/ analysis-n-nitroso-glyphosate-glyphosate-samples+&cd=2&hl=en &ct=clnk&gl=us, 3 pages.
International Search Report and Written Opinion issued in PCT/ US2017/46012, dated Oct. 27, 2017.
R.E.D. Facts, "Glyphosate", EPA-738-F-93-011, Sep. 1993, Prevention, Pesticides and Toxic Substances (7508W), U.S. Environmental Protection Agency, 7 pages.

* cited by examiner

*Primary Examiner* — Alton N Pryor
(74) *Attorney, Agent, or Firm* — Stinson LLP

(57) ABSTRACT

The present invention generally relates to solid herbicidal concentrate compositions comprising one or more herbicide salts, particularly salts of acidic herbicides such as glyphosate salts, glufosinate salts, and/or various auxin herbicide salts. The present invention further relates to various processes for preparing the solid herbicidal concentrate compositions as well as methods of using the solid herbicidal concentrate compositions to prepare herbicidal application mixtures.

23 Claims, No Drawings

SOLID HERBICIDAL CONCENTRATE COMPOSITIONS

FIELD OF THE INVENTION

The present invention generally relates to solid herbicidal concentrate compositions comprising one or more herbicide salts, particularly salts of acidic herbicides such as glyphosate salts, glufosinate salts, and/or various auxin herbicide salts. The present invention further relates to various processes for preparing the solid herbicidal concentrate compositions as well as methods of using the solid herbicidal concentrate compositions to prepare herbicidal application mixtures.

BACKGROUND OF THE INVENTION

Solid herbicidal concentrate compositions are particularly advantageous in remote geographic regions where transporting bulk quantities of liquid formulations is challenging. Solid herbicidal concentrate compositions are also typically lighter in weight as compared to liquid formulations because they do not contain the added weight of a carrier liquid. As a result, solid compositions are preferred over liquids when transporting by human or animal power. Further, solid compositions provide for some superior handling characteristics over liquids especially with respect to spillage.

To enhance the efficiency of applying herbicidal active ingredients, it is highly desirable to combine two or more active ingredients in a single composition. Also, applying a combination of active ingredients with different modes of action can provide for a broader spectrum of weed control. Concentrate compositions containing high loadings of multiple active ingredients are also beneficial in avoiding or reducing mixing errors when preparing the herbicidal application mixture in the field. Thus, solid herbicidal concentrate compositions containing a combination of herbicidal active ingredients are further advantageous for these reasons.

However, preparing solid herbicidal concentrate compositions entails overcoming inherent disadvantages relating to increased production cost and comparative complexity of compounding a solid composition from a combination of liquid and solid reactants rather than making a liquid formulation from the same reactants. Also, various additives, such as surfactants, are typically added to herbicidal formulations to enhance or improve a property of the formulation such as efficacy or handling characteristics. Some of these additives may not be readily compatible with processes for preparing the solid compositions or may be sensitive to process conditions including elevated temperatures during herbicide salt formation and various drying stages.

In view of these problems, there remains a need for solid herbicidal concentrate compositions that contain a combination of herbicide active ingredients as well as solid herbicidal concentrate compositions that contain additives that have not been negatively affected by process conditions. There also remains a need for effective strategies for preparing these compositions.

SUMMARY OF THE INVENTION

Briefly, the present invention includes solid herbicidal concentrate compositions. Various solid herbicidal concentrate compositions comprise a glyphosate salt component and a monocarboxylic acid salt, wherein the glyphosate salt component comprises glyphosate anions and a monovalent salt-forming cation, and wherein the molar ratio of the monovalent salt-forming cation to total glyphosate anions is from about 1.2:1 to about 1.75:1, and the glyphosate salt component concentration on an acid equivalent basis is at least about 20 wt. %. These solid herbicidal concentrate compositions can further comprise an auxin herbicide salt component.

Other solid herbicidal concentrate compositions comprise an auxin herbicide salt component, a co-herbicide salt component, and a monocarboxylic acid salt, wherein the co-herbicide salt component comprises one or more acidic co-herbicides comprising a first and a second ionizable acid groups and a monovalent salt-forming cation, and wherein the molar ratio of the monovalent salt-forming cation to the first ionizable acid group is at least about 1.1:1, at least about 1.2:1, at least about 1.25:1, or at least about 1.3:1, and wherein the auxin herbicide salt component concentration on an acid equivalent basis is at least about 10 wt. %.

The present invention further includes methods for preparing aqueous herbicidal mixtures from the solid herbicidal concentrate compositions. Various methods of preparing aqueous herbicidal mixtures comprise mixing any one of the solid herbicidal concentrate composition described herein with water. Other methods of preparing aqueous herbicidal mixtures comprise mixing any one of the solid herbicidal concentrate compositions described herein with an auxin herbicide salt, and water.

The present invention also includes processes for preparing solid herbicidal concentrate compositions. Various processes comprise mixing glyphosate acid, a base, and water to form a reaction mass, wherein the base comprises a monovalent salt-forming cation and the molar ratio of the monovalent salt-forming cation to glyphosate acid in the reaction mass is from about 1.2 to about 1.75; reducing the water content of the reaction mass to produce a herbicidal paste; mixing a monocarboxylic acid salt with the herbicidal paste; forming the herbicidal paste comprising the glyphosate salt and monocarboxylic acid salt to form herbicidal granules; and drying the herbicidal granules to produce the solid herbicidal concentrate composition.

Other processes for preparing solid herbicidal concentrate compositions comprise mixing glyphosate acid, an auxin herbicide acid, a base, and water to form a reaction mass, wherein the amount of base is sufficient to fully neutralize the auxin herbicide acid and neutralize from about 1.2 to about 1.75 of the ionizable acid groups of the glyphosate acid; reducing the water content of the reaction mass to produce a herbicidal paste; mixing a monocarboxylic acid salt with the herbicidal paste; forming the herbicidal paste comprising the glyphosate salt, auxin herbicide salt, and monocarboxylic acid salt to form herbicidal granules; and drying the herbicidal granules to produce the solid herbicidal concentrate composition.

Further processes for preparing solid herbicidal concentrate compositions comprise mixing a co-herbicide acid, a base, and water to form a reaction mass comprising a co-herbicide salt, wherein the co-herbicide acid comprises a first and a second ionizable acid groups, the base comprises a monovalent salt-forming cation, and the molar ratio of the monovalent salt-forming cation to the first ionizable acid group is at least about 1.1:1; at least about 1.2:1, at least about 1.25:1, or at least about 1.3:1; reducing the water content of the reaction mass to produce a herbicidal paste; mixing a monocarboxylic acid salt and an auxin herbicide salt with the herbicidal paste; forming the herbicidal paste comprising the co-herbicide salt, monocarboxylic acid salt and auxin herbicide salt to form herbicidal granules; and drying the herbicidal granules to produce the solid herbicidal concentrate composition.

Additional processes for preparing solid herbicidal concentrate compositions comprise mixing an auxin herbicide acid, a co-herbicide acid, a base, and water to form a reaction mass, wherein the co-herbicide acid comprises a first and a second ionizable acid groups and wherein the amount of base is sufficient to fully neutralize the auxin herbicide acid and neutralize from about 1.2 to about 1.75 of the ionizable acid groups of the co-herbicide acid; reducing the water content of the reaction mass to produce a herbicidal paste; mixing a monocarboxylic acid salt with the herbicidal paste; forming the herbicidal paste comprising the auxin herbicide salt, co-herbicide salt, and monocarboxylic acid salt to form herbicidal granules; and drying the herbicidal granules to produce the solid herbicidal concentrate composition.

Other objects and features will be in part apparent and in part pointed out hereinafter.

DESCRIPTION OF THE PREFERRED EMBODIMENTS

The present invention generally relates to solid herbicidal concentrate compositions comprising one or more herbicide salts, particularly salts of acidic herbicides. The present invention further relates to various processes for preparing the solid herbicidal concentrate compositions as well as methods of using the solid herbicidal concentrate compositions to prepare aqueous herbicidal mixtures.

Aspects of the present invention are directed to solid herbicidal concentrate compositions comprising a glyphosate salt component and an additive that is useful for further reducing the volatility of an auxin herbicide when mixed in solution with the solid herbicidal concentrate composition (e.g., tank mixed). These solid herbicidal concentrate compositions provide a convenient means of incorporating both glyphosate herbicide and the additive into an auxin herbicide-containing tank mixture. A single composition containing both ingredients can reduce possible tank mixing errors as compared to separate compositions. Further, the storage space and associated packaging that would otherwise be required for separate compositions is reduced.

Further aspects of the present invention are directed to solid herbicidal concentrate compositions comprising an auxin herbicide salt component, a co-herbicide salt component, and an additive that is useful for further reducing the volatility of an auxin herbicide when mixed in with water to form an application mixture and applied. The storage space, associated packaging, and weight for transport are expected to be less than that would otherwise be required for separate compositions. Solid herbicidal concentrate compositions containing a combination of active herbicidal ingredients also improves the efficiency at which the herbicides are applied to the treatment area, thereby reducing crop production costs. These compositions also reduce possible tank mixing errors as compared to separate compositions of each ingredient.

Other aspects of the present invention are directed to various processes for preparing solid herbicidal concentrate compositions that include an additive for reducing the volatility of an auxin herbicide. Advantageously, these processes reduce or eliminate substantial degradation or loss of the additive during processing.

Solid Herbicidal Concentrate Compositions

Generally, the solid herbicidal concentrate compositions of the present invention comprise a herbicide salt component and an additive for reducing the volatility of an auxin herbicide. Typically, the additive for reducing the volatility of an auxin herbicide comprises a monocarboxylic acid salt. Examples of these additives including monocarboxylic acid salts (monocarboxylates) are described in U.S. Patent Application Publication No. 2014/0128264, which is incorporated herein by reference. In various embodiments, the monocarboxylic acid salt has the formula $R^1$—C(O)OM, wherein $R^1$ is substituted or unsubstituted $C_1$-$C_{20}$ alkyl, substituted or unsubstituted $C_2$-$C_{20}$ alkenyl, substituted or unsubstituted aryl (e.g., phenyl, and hydroxyphenyl), and substituted or unsubstituted arylalkyl (e.g., benzyl); and M is an agriculturally acceptable cation. As used herein, the terms "alkyl" and "alkenyl" include branched and unbranched (straight chain) species of these substituents. Alkenyl substituents include at least one carbon-carbon double bond.

In some embodiments, $R^1$ is substituted or unsubstituted $C_1$-$C_5$ alkyl (e.g., methyl, ethyl, n-propyl, isopropyl, and butyl), substituted or unsubstituted $C_2$-$C_5$ alkenyl (e.g., ethenyl, n-propenyl, and isopropenyl), substituted or unsubstituted phenyl, or substituted or unsubstituted aryl($C_1$-$C_4$) alkyl (e.g., substituted or unsubstituted benzyl). In certain embodiments, $R^1$ is $C_1$-$C_5$ alkyl, $C_2$-$C_5$ alkenyl, phenyl, and benzyl. In particular embodiments, the monocarboxylic acid salt comprises a salt of an acid selected from the group consisting of formic acid, acetic acid, propionic acid, benzoic acid, phenylacetic acid and mixtures thereof.

As noted, M is an agriculturally acceptable cation. For example, M can be a monovalent metal cation (e.g., akali metals cations such as sodium cation, potassium cation, and mixtures thereof). In some embodiments, the monocarboxylic acid salt comprises a salt-forming cation that is the same as the monovalent salt-forming cation of the herbicide salt component. In certain embodiments, the monocarboxylic acid salt comprises sodium acetate and/or potassium acetate.

The concentration of the monocarboxylic acid salt in the solid herbicidal concentrate composition can range from about 0.25 wt. % to about 10 wt. %, from about 0.25 wt. % to about 7.5 wt. %, from about 0.25 wt. % to about 5 wt. %, from about 0.5 wt. % to about 10 wt. %, from about 0.5 wt. % to about 7.5 wt. %, from about 0.5 wt. % to about 5 wt. %, from about 1 wt. % to about 10 wt. %, from about 1 wt. % to about 7.5 wt. %, from about 1 wt. % to about 5 wt. %, from about 2 wt. % to about 10 wt. %, from about 2 wt. % to about 7.5 wt. %, or from about 2 wt. % to about 5 wt. %.

Solid Herbicidal Concentrate Compositions Comprising a Glyphosate Salt Component Various solid herbicidal concentrate compositions of the present invention can further comprise a glyphosate salt component as the herbicide salt component. In these embodiments, the solid herbicidal concentrate compositions comprise a glyphosate salt component and a monocarboxylic acid salt wherein the glyphosate salt component comprises glyphosate anions and a monovalent salt-forming cation, and wherein the molar ratio of the monovalent salt-forming cation to total glyphosate anions is from about 1.2:1 to about 1.75:1, and the glyphosate salt component concentration on an acid equivalent basis is at least about 20 wt. %.

The glyphosate salt component can include a single salt of glyphosate or a mixture of two or more different salts. As noted, the glyphosate salt component can be specified in terms of its constituent ions. Thus, the glyphosate salt component comprises glyphosate anions and a monovalent salt-forming cation. Since glyphosate is a polyprotic molecule, the term "glyphosate anions" includes the possible anions of glyphosate that may be present including, for example, mono-anions and di-anions.

Monovalent salt-forming cations of glyphosate include, for example, various alkali metal and ammonium-containing cations such as potassium (K), sodium (Na), ammonium ($NH_4$), isopropylammonium (IPA), monoethanolammonium (MEA), diethanolammonium (DEA), triethanolammonium (TEA), dimethylammonium (DMA), and mixtures thereof. In some embodiments, the monovalent salt-forming cation of the glyphosate salt component is selected from the group consisting of potassium, sodium, isopropylammonium, monoethanolammonium, triethanolammonium, and mixtures thereof. In certain embodiments, the monovalent salt-forming cation of the glyphosate salt component comprises, or consists essentially of potassium.

In certain instances, ammonium glyphosate salts have been found to be less preferred as compared to other salts. Accordingly, in these embodiments, the solid herbicidal concentrate composition can be free or essentially free of ammonium and/or diammonium glyphosate salts. For example, in some embodiments, the composition contains no more than about 1 wt. %, no more than about 0.5 wt. %, no more than about 0.25 wt. %, no more than about 0.1 wt. %, or no more than about 0.01 wt. % of ammonium and/or diammonium glyphosate salts.

During preparation of the solid herbicidal concentrate composition comprising a glyphosate salt component, it was found that the anion of the monocarboxylic acid salt could be protonated to its corresponding acid. Some of these monocarboxylic acids are volatile, especially at elevated temperatures, and as a result can be lost to a certain extent during processing. Applicants discovered that providing an over-neutralized salt of glyphosate during this process beneficially eliminates or reduces the amount of monocarboxylic acid salt that would otherwise be lost during preparation of these solid herbicidal concentrate compositions. Accordingly, in these embodiments, the molar ratio of the monovalent salt-forming cation to total glyphosate anions in the glyphosate salt component of the solid herbicidal concentrate composition is generally from about 1.2:1 to about 1.75:1. In other words, the glyphosate salt(s) contained in the solid herbicidal concentrate composition are fully neutralized with respect to the first acid site of glyphosate and partially neutralized with respect to the second acid site. In various embodiments, the molar ratio of the monovalent salt-forming cation to total glyphosate anions in the glyphosate salt component is from about 1.25:1 to about 1.75:1, from about 1.3:1 to about 1.75:1, from about 1.4:1 to about 1.75:1, from about 1.2:1 to about 1.6:1, from about 1.25:1 to about 1.6:1, from about 1.3:1 to about 1.6:1, from about 1.4:1 to about 1.6:1, from about 1.2:1 to about 1.5:1, from about 1.25:1 to about 1.5:1, from about 1.3:1 to about 1.5:1, or from about 1.4:1 to about 1.5:1.

These solid herbicidal concentrate compositions typically contain a high concentration of glyphosate, which is at least about 20 wt. %, at least about 30 wt. %, at least about 40 wt. %, at least about 50 wt. %, or at least about 60 wt. % on an acid equivalent basis. As used herein, the term "acid equivalent" or "a.e." refers to the amount of herbicide present without taking into account the weight of the counter-ion of the salt species present. In various embodiments, the glyphosate salt component concentration on an acid equivalent basis is from about 20 wt. % to about 80 wt. %, from about 20 wt. % to about 70 wt. %, from about 20 wt. % to about 60 wt. %, from about 20 wt. % to about 50 wt. %, from about 30 wt. % to about 80 wt. %, from about 30 wt. % to about 70 wt. %, from about 30 wt. % to about 60 wt. %, from about 30 wt. % to about 50 wt. %, from about 40 wt. % to about 80 wt. %, from about 40 wt. % to about 70 wt. %, from about 40 wt. % to about 60 wt. %, or from about 40 wt. % to about 50 wt. %.

The solid herbicidal concentrate composition comprising a glyphosate salt component and a monocarboxylic acid salt can further comprise an auxin herbicide salt component. For example, the auxin herbicide salt component can comprise a salt of one or more auxin herbicides selected from the group consisting of 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5-trichlorophenoxyacetic acid (2,4,5-T); aminopyralid; clopyralid; fluroxypyr; triclopyr; mecoprop; picloram; quinclorac; aminocyclopyrachlor; and mixtures thereof. In certain embodiments, the auxin herbicide salt component comprises a dicamba salt and/or 2,4-D salt.

The auxin herbicide salt component generally comprises an agronomically acceptable cation. In various embodiments, the auxin herbicide salt component comprises a cation selected from the group consisting of potassium (K), sodium (Na), ammonium ($NH_4$), isopropylammonium (IPA), monoethanolammonium (MEA), diethanolammonium (DEA), triethanolammonium (TEA), dimethylammonium (DMA), diglycolammonium (DGA), and mixtures thereof. In some embodiments, the auxin herbicide salt component comprises a dicamba salt, which can be selected from the group consisting of the sodium salt of dicamba, the potassium salt of dicamba, the monoethanolamine salt of dicamba, the diglycolamine salt of dicamba, the dimethylamine salt of dicamba, and combinations thereof.

Other agronomically acceptable cations include polyamines such as those described in U.S. Patent Application Publication No. 2012/0184434, which is incorporated herein by reference. The cationic polyamines described in U.S. 2012/0184434 include those of formula (A)

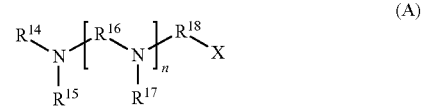

(A)

wherein $R^{14}$, $R^{15}$, $R^{17}$, $R^{19}$ and $R^{20}$ are independently H or $C_1$-$C_6$-alkyl, which is optionally substituted with OH, $R^{16}$ and $R^{18}$ are independently $C_2$-$C_4$-alkylene, X is OH or $NR^{19}R^{20}$, and n is from 1 to 20; and those of formula (B)

(B)

wherein $R^{21}$ and $R^{22}$ are independently H or $C_1$-$C_6$-alkyl, $R^{23}$ is $C_1$-$C_{12}$-alkylene, and $R^{24}$ is an aliphatic $C_5$-$C_8$ ring system, which comprises either nitrogen in the ring or which is substituted with at least one unit $NR^{21}R^{22}$. Specific examples of these cationic polyamines include tetraethylenepentamine, triethylenetetramine, di ethylenetriamine, pentamethyldiethylenetriamine, N,N,N',N'',N''-pentamethyl-dipropylenetriamine, N,N-bis(3-dimethylaminopropyl)-N-isopropanolamine, N'-(3-(dimethylamino)propyl)-N, N-dimethyl-1,3-propanediamine, N,N-bis(3-aminopropyl) methylamine, N-(3-dimethylaminopropyl)-N,N-diisopropanolamine, N,N,N'-trimethylaminoethyl-ethanolamine, aminopropylmonomethylethanolamine, and aminoethylethanolamine, and mixtures thereof.

In embodiments in which the solid herbicidal concentrate composition comprises an auxin herbicide salt component, the auxin herbicide salt component concentration on an acid equivalent basis can be at least about 10 wt. %, at least about 20 wt. %, at least about 30 wt. %, at least about 40 wt. %, or at least about 50 wt. %. The auxin herbicide salt component concentration on an acid equivalent basis can also range from about 10 wt. % to about 60 wt. %, from about 10 wt. % to about 50 wt. %, from about 10 wt. % to about 40 wt. %, from about 10 wt. % to about 30 wt. %, from about 15 wt. % to about 60 wt. %, from about 15 wt. % to about 50 wt. %, from about 15 wt. % to about 40 wt. %, from about 15 wt. % to about 30 wt. %, from about 20 wt. % to about 60 wt. %, from about 20 wt. % to about 50 wt. %, from about 20 wt. % to about 40 wt. %, or from about 20 wt. % to about 30 wt. %. Also, in these and other embodiments, the weight ratio of the glyphosate salt component to the auxin herbicide salt component on an acid equivalent basis can be from about 10:1 to about 1:10, from about 5:1 to about 1:5, from about 5:1 to about 1:4, from about 5:1 to about 1:3, from about 5:1 to about 1:2, from about 5:1 to about 1:1, from about 5:1 to about 1.5:1, from about 3:1 to about 1:4, from about 3:1 to about 1:3, from about 3:1 to about 1:2, from about 3:1 to about 1:1, from about 3:1 to about 1.5:1, from about 2:1 to about 1:4, from about 2:1 to about 1:3, from about 2:1 to about 1:2, from about 2:1 to about 1:1, or from about 2:1 to about 1.5:1.

Solid Herbicidal Concentrate Compositions Comprising an Auxin Herbicide Salt Component and Co-Herbicide Salt Component Other solid herbicidal concentrate compositions of the present invention comprise an auxin herbicide salt component and a co-herbicide salt component as the herbicide salt components. In particular, these solid herbicidal concentrate compositions comprise an auxin herbicide salt component, a co-herbicide salt component, and a monocarboxylic acid salt, wherein the co-herbicide salt component comprises one or more acidic co-herbicides comprising a first and a second ionizable acid groups and a monovalent salt-forming cation, and wherein the molar ratio of the monovalent salt-forming cation to the first ionizable acid group is at least about 1.1:1 at least about 1.2:1, at least about 1.25:1, or at least about 1.3:1, and wherein the auxin herbicide salt component concentration on an acid equivalent basis is at least about 10 wt. %. In these embodiments, the auxin herbicide salt component and the monocarboxylic acid salt include any of those as described herein.

As noted, the co-herbicide salt component comprises one or more acidic co-herbicide salts comprising a first and a second ionizable acid groups and a monovalent salt-forming cation. In other words, the acidic co-herbicide is polyprotic. Examples of polyprotic acidic co-herbicides include, for example, glyphosate, glufosinate (resolved isomers and racemic mixtures), and mixtures thereof.

The monovalent salt-forming cation of the co-herbicide salt component can include various alkali metal and ammonium-containing cations such as potassium, sodium, ammonium, isopropylammonium, monoethanolammonium, diethanolammonium, triethanolammonium, dimethylammonium, and mixtures thereof. In various embodiments, the monovalent salt-forming cation of the co-herbicide salt component is selected from the group consisting of potassium, sodium, isopropylammonium, monoethanolammonium, triethanolammonium, and mixtures thereof. In some embodiments, the monovalent salt-forming cation of the co-herbicide salt component comprises, or consists essentially of potassium.

In certain instances, ammonium co-herbicide salts have been found to be less preferred as compared to other salts. Accordingly, in these embodiments, the solid herbicidal concentrate composition can be free or essentially free of ammonium and/or diammonium co-herbicide salts. For example, in some embodiments, the composition contains no more than about 1 wt. %, no more than about 0.5 wt. %, no more than about 0.25 wt. %, no more than about 0.1 wt. %, or no more than about 0.01 wt. % of ammonium and/or diammonium co-herbicide salts.

As in the preparation of solid herbicidal concentrate compositions comprising a glyphosate salt component, applicants similarly found that during preparation of a solid herbicidal concentrate composition comprising an auxin herbicide salt component and co-herbicide salt component, the anion of the monocarboxylic acid salt could be protonated to its corresponding acid. As noted, some of these monocarboxylic acids are volatile, especially at elevated temperatures, and as a result can be lost to a certain extent during processing. Applicants discovered that providing an over-neutralized salt of a polyprotic acidic co-herbicide during this process beneficially eliminates or reduces the amount of monocarboxylic acid salt that would otherwise be lost during preparation of these solid herbicidal concentrate compositions. Accordingly, the molar ratio of the monovalent salt-forming cation of the co-herbicide salt component to the first ionizable acid group of the co-herbicide salt component is generally at least about 1.1:1, at least about 1.2:1, at least about 1.25:1, or at least about 1.3:1. In some embodiments, the molar ratio of the monovalent salt-forming cation to the first ionizable acid group is from about 1.2:1 to about 1.75:1, from about 1.25:1 to about 1.75:1, from about 1.3:1 to about 1.75:1, from about 1.4:1 to about 1.75:1, from about 1.2:1 to about 1.6:1, from about 1.25:1 to about 1.6:1, from about 1.3:1 to about 1.6:1, from about 1.4:1 to about 1.6:1, from about 1.2:1 to about 1.5:1, from about 1.25:1 to about 1.5:1, from about 1.3:1 to about 1.5:1, or from about 1.4:1 to about 1.5:1. The molar ratio of the monovalent salt-forming cation to the first ionizable acid group of the co-herbicide salt component does not include any salt-forming cation that may be present from the auxin herbicide salt. That is, the total amount of salt-forming cation is in molar excess with respect to the acidic components (polyprotic acidic co-herbicide and auxin herbicide).

These solid herbicidal concentrate compositions typically contain a high concentration of the auxin herbicide. For example, in various embodiments, the auxin herbicide salt component concentration on an acid equivalent basis is at least about 10 wt. %, at least about 20 wt. %, at least about 30 wt. %, at least about 40 wt. %, or at least about 50 wt. %. In some embodiments, the auxin herbicide salt component concentration on an acid equivalent basis is from about 10 wt. % to about 60 wt. %, from about 10 wt. % to about 50 wt. %, from about 10 wt. % to about 40 wt. %, from about 10 wt. % to about 30 wt. %, from about 15 wt. % to about 60 wt. %, from about 15 wt. % to about 50 wt. %, from about 15 wt. % to about 40 wt. %, from about 15 wt. % to about 30 wt. %, from about 20 wt. % to about 60 wt. %, from about 20 wt. % to about 50 wt. %, from about 20 wt. % to about 40 wt. %, or from about 20 wt. % to about 30 wt. %.

In addition, the total co-herbicide salt component concentration on an acid equivalent basis can be from about 20 wt.

% to about 80 wt. %, from about 20 wt. % to about 70 wt. %, from about 20 wt. % to about 60 wt. %, from about 20 wt. % to about 50 wt. %, from about 30 wt. % to about 80 wt. %, from about 30 wt. % to about 70 wt. %, from about 30 wt. % to about 60 wt. %, from about 30 wt. % to about 50 wt. %, from about 40 wt. % to about 80 wt. %, from about 40 wt. % to about 70 wt. %, from about 40 wt. % to about 60 wt. %, or from about 40 wt. % to about 50 wt. %. Further, in these and other embodiments, the weight ratio of the co-herbicide salt component to the auxin herbicide salt component on an acid equivalent basis is from about 10:1 to about 1:10, from about 5:1 to about 1:5, from about 5:1 to about 1:4, from about 5:1 to about 1:3, from about 5:1 to about 1:2, from about 5:1 to about 1:1, from about 5:1 to about 1.5:1, from about 3:1 to about 1:4, from about 3:1 to about 1:3, from about 3:1 to about 1:2, from about 3:1 to about 1:1, from about 3:1 to about 1.5:1, from about 2:1 to about 1:4, from about 2:1 to about 1:3, from about 2:1 to about 1:2, from about 2:1 to about 1:1, or from about 2:1 to about 1.5:1.

The solid herbicidal concentrate compositions as described herein can also include other additives such as bulking agents, fillers, surfactants, and anti-foaming agents. In various embodiments, the solid herbicidal concentrate compositions further comprise an additive comprising sulfate ions, such as sodium sulfate. In some embodiments, the solid herbicidal concentrate compositions further comprise an additive comprising sulfite ions, such as sodium sulfite. In these and other embodiments, the solid herbicidal concentrate compositions further comprise an anti-foam agent.

In various embodiments, the solid herbicidal concentrate compositions further comprise a surfactant. Surfactants generally include nonionic surfactants, cationic surfactants, anionic surfactants, amphoteric surfactants, and mixtures thereof.

Examples of suitable nonionic surfactants include alkylpolyglucosides; glycerol esters such as glyceryl monolaurate, and ethoxylated glyceryl monococoate; ethoxylated castor oil; ethoxylated reduced sugar esters such as polyoxyethylene sorbitol monolaurate; esters of other polyhydric alcohols such as sorbitan monolaurate and sucrose monostearate; ethoxylated amides such as polyoxyethylene cocoamide; ethoxylated esters such as monolaurate of polyethylene glycol 1000 and dilaurate of polyethylene glycol 6000; ethoxylated alkyl or arylphenols such as nonylphenol ethoxylate, octylphenol ethoxylates, dodecylphenol ethoxylates, dinonylphenol ethoxylates and tristyrylphenol ethoxylates; alcohol ethoxylates such as fatty alcohol ethoxylates (e.g., oleyl alcohol ethoxylate), tridecylalcohol ethoxylates and other alcohol ethoxylates such as neodols and oxoalcohol ethoxylates; and ethylene oxide/propylene oxide copolymers such as pluronic type, tetronic type, or tergitol XH type.

Examples of suitable cationic surfactants include alkylamine ethoxylates (including etheramines and diamines) such as tallowamine ethoxylate, cocoamine ethoxylate, etheramine ethoxylate, tallow ethylenediamine ethoxylate and amidoamine ethoxylates; alkylamine quaternary amines such as alkoxylated quaternary amines (e.g., ethoxylated quaternary amines or propoxylated quaternary amines); alkylamine acetates such as tallowamine acetate or octylamine acetate; and amine oxides such as ethoxylated amine oxides (e.g., N,N-bis(2-hydroxyethyl)cocoamine-oxide), nonethoxylated amine oxides (e.g., cethyldimethylamine-oxide) and amidoamine oxides.

Examples of suitable anionic surfactants include fatty soaps such as ammonium tallowate and sodium stearate; alkyl sulfates such as sodium $C_{8-10}$ alcohol sulfate, sodium oleyl sulfate, and sodium lauryl sulfate; sulfated oils such as sulfated castor oil; ether sulfates such as sodium lauryl ether sulfate, ammonium lauryl ether sulfate, and ammonium nonylphenol ether sulfate; sulfonates such as petroleum sulfonates, alkylbenzene sulfonates (e.g., sodium (linear) dodecylbenzene sulfonate or sodium (branched) dodecylbenzene sulfonate), alkylnapthalene sulfonates (e.g., sodium dibutylnapthalene sulfonate), alkyl sulfonates (e.g., alpha olefin sulfonates), sulfosuccinates such as dialkylsulfosuccinates (e.g., sodium dioctylsulfosuccinate) and monoalkylsulfosuccinate and succinamides (e.g., disodium laurylsulfosuccinate and disodium N-alkylsulfosuccinamate); sulfonated amides such as sodium N-methyl N-coco taurate; isethionates such as sodium cocoyl isethionate; sarcosinates such as N-lauroyl sarcosine; and phosphates such as alkylether ethoxylate phosphates and alkylarylether ethoxylated phosphates.

Examples of suitable amphoteric surfactants include betaines such as simple betaines (e.g., cocodimethylbetaine), sulfobetaines, amidobetaines, and cocoamidosulfobetaines; imidazolinium compounds such as disodium lauroamphodiacetate, sodium cocoamphoacetate, sodium cocoamphopropionate, disodium cocoaminodipropionate, and sodium cocoamphohydoxypropyl sulfonate; and other amphoteric surfactants such as N-alkyl, N,-bis(2-hydroxyethyl)glycine and alkylaminedipropionates.

Methods of Preparing Aqueous Herbicidal Mixtures from the Solid Herbicidal Concentrate Compositions The present invention also includes methods for preparing aqueous herbicidal application mixtures using the solid herbicidal concentrate compositions. Generally, these methods comprise mixing a solid herbicidal concentrate composition as described herein with water to form the aqueous herbicidal application mixture. Further methods comprise mixing a solid herbicidal concentrate composition, such as the composition comprising a glyphosate salt component and a monocarboxylic acid salt as described herein, with water and a co-herbicide. That is, the solid herbicidal concentrate compositions can be tank mixed (mixed in solution) with one or more additional co-herbicides or solutions of one or more of these co-herbicides. For example, one method comprises mixing the solid herbicidal concentrate composition comprising a glyphosate salt component and a monocarboxylic acid salt as described herein with water and an auxin herbicide salt (or solution of the auxin herbicide salt) to form an aqueous herbicidal application mixture.

Typically, the herbicide loading in the aqueous application mixture is no more than about 10 wt. %, no more than about 5 wt. %, or is from about 1 wt. % to about 10 wt. %, from about 0.1 wt. % to about 5 wt. %, from about 2 wt. % to about 5 wt. %, such as 5 wt. %, 4 wt. %, 3 wt. %, 2 wt. %, 1 wt. %, 0.5 wt. % or 0.1 wt. % on an acid equivalent basis.

The present invention also includes methods of applying the aqueous herbicidal application mixtures prepared at least in part using a solid herbicidal concentrate composition described herein to control weeds, for example, in a field of crop plants. Commercially important crop plants include, for example, corn, soybean, cotton, dry beans, snap beans, and potatoes. Crop plants include hybrids, inbreds, and transgenic or genetically modified plants having specific traits or combinations of traits including, without limitation, herbicide tolerance (e.g., resistance to glyphosate, glufosinate, dicamba, etc.), *Bacillus thuringiensis* (Bt), high oil, high lysine, high starch, nutritional density, and drought resistance. In some embodiments, the crop plants are tolerant to organophosphorus herbicides, acetolactate synthase (ALS) or acetohydroxy acid synthase (AHAS) inhibitor herbicides, auxin herbicides and/or acetyl CoA carboxylase (ACCase) inhibitor herbicides. In other embodiments the crop plants are tolerant to glyphosate, dicamba, 2,4-D, MCPA, quizalofop, glufosinate and/or diclofop-methyl. In certain embodiments, the crop plant is glyphosate and/or dicamba tolerant. In some embodiments of the present invention, crop plants are glyphosate and/or glufosinate tolerant. In other embodiments, the crop plants are glyphosate, glufosinate and dicamba tolerant.

The herbicidal application mixture may be applied to the treatment area or field or crop plants according to practices known to those skilled in the art. The herbicidal application mixture can be applied at various stages such as before the emergence of the weeds (pre-emergent to the weeds), after emergence of the weeds (post-emergent to the weeds), before planting of the crop plants (pre-plant), after planting of the crop plants (post-plant), before emergence of the crop plant (pre-emergence to the crop), and/or after emergence of the crop-plant (post-emergence to the crop). In certain embodiments, the herbicidal application mixture is applied before and/or after emergence of the weed. The herbicidally effective amount of the herbicidal application mixture to be applied is dependent upon various factors including the identity of the herbicides, the crop to be treated, and environmental conditions such as soil type and moisture content.

Aqueous herbicidal application mixtures of the present invention are useful for controlling a wide variety of weeds, i.e., plants that are considered to be a nuisance or a competitor of commercially important crop plants. Examples of weeds that may be controlled according to methods of the present invention include, but are not limited to, Meadow Foxtail (*Alopecurus pratensis*) and other weed species with the *Alopecurus* genus, Common Barnyard Grass (*Echinochloa crus-galli*) and other weed species within the *Echinochloa* genus, crabgrasses within the genus *Digitaria*, White Clover (*Trifolium repens*), Lambsquarters (*Chenopodium berlandieri*), Redroot Pigweed (*Amaranthus retroflexus*) and other weed species within the *Amaranthus* genus, Common Purslane (*Portulaca oleracea*) and other weed species in the *Portulaca* genus, *Chenopodium album* and other *Chenopodium* spp., *Setaria lutescens* and other *Setaria* spp., *Solanum nigrum* and other *Solanum* spp., *Lolium multiflorum* and other *Lolium* spp., *Brachiaria platyphylla* and other *Brachiaria* spp., *Sorghum halepense* and other *Sorghum* spp., *Conyza Canadensis* and other *Conyza* spp., and *Eleusine indica*. In some embodiments, the weeds comprise one or more glyphosate-resistant species, 2,4-D-resistant species, dicamba-resistant species and/or ALS inhibitor herbicide-resistant species. In certain embodiments, the glyphosate-resistant weed species is selected from the group consisting of *Amaranthus palmeri, Amaranthus rudis, Ambrosia artemisiifolia, Ambrosia trifida, Conyza bonariensis, Conyza canadensis, Digitaria insularis, Echinochloa colona, Eleusine indica, Euphorbia heterophylla, Lolium multiflorum, Lolium rigidum, Plantago lancelata, Sorghum halepense*, and *Urochloa panicoides*.

Processes for Preparing Solid Herbicidal Concentrate Compositions

The present invention is also directed to various processes for preparing the solid herbicidal concentrate compositions. Generally, the processes involve over-neutralizing a polyprotic herbicide, such as glyphosate and mixing the monocarboxylic acid salt after the over-neutralized herbicide salt has been formed and water has been removed to a certain extent.

One process for preparing the solid herbicidal concentrate composition comprising a glyphosate salt component and a monocarboxylic acid salt includes the steps of:

mixing glyphosate acid, a base, and water to form a reaction mass, wherein the base comprises a monovalent salt-forming cation and the molar ratio of the monovalent salt-forming cation to glyphosate acid in the reaction mass is from about 1.2 to about 1.75;

reducing the water content of the reaction mass to produce a herbicidal paste;

mixing a monocarboxylic acid salt with the herbicidal paste;

forming the herbicidal paste comprising the glyphosate salt and monocarboxylic acid salt to form herbicidal granules; and drying the herbicidal granules to produce the solid herbicidal concentrate composition.

In some embodiments, the molar ratio of the monovalent salt-forming cation to glyphosate acid is from about 1.25:1 to about 1.75:1, from about 1.3:1 to about 1.75:1, from about 1.4:1 to about 1.75:1, from about 1.2:1 to about 1.6:1, from about 1.25:1 to about 1.6:1, from about 1.3:1 to about 1.6:1, from about 1.4:1 to about 1.6:1, from about 1.2:1 to about 1.5:1, from about 1.25:1 to about 1.5:1, from about 1.3:1 to about 1.5:1, or from about 1.4:1 to about 1.5:1.

In various embodiments, this process can further comprise mixing an auxin herbicide salt with the reaction mass and/or the herbicidal paste. Accordingly, in these embodiments, the solid herbicidal concentrate composition comprises a glyphosate salt component, an auxin herbicide salt component, and a monocarboxylic acid salt.

A process for preparing a solid herbicidal concentrate composition comprising an auxin herbicide salt component, a co-herbicide salt component, and a monocarboxylic acid salt comprises the steps of:

mixing a co-herbicide acid, a base, and water to form a reaction mass comprising a co-herbicide salt, wherein the co-herbicide acid comprises a first and a second ionizable acid groups, the base comprises a monovalent salt-forming cation, and the molar ratio of the monovalent salt-forming cation to the first ionizable acid group of the co-herbicide acid is at least about 1.1:1; at least about 1.2:1, at least about 1.25:1, or at least about 1.3:1;

reducing the water content of the reaction mass to produce a herbicidal paste;

mixing a monocarboxylic acid salt and an auxin herbicide salt with the herbicidal paste;

forming the herbicidal paste comprising the co-herbicide salt, monocarboxylic acid salt and auxin herbicide salt to form herbicidal granules; and drying the herbicidal granules to produce the solid herbicidal concentrate composition.

In some embodiments of these processes, the molar ratio of the monovalent salt-forming cation to the first ionizable acid group of the co-herbicide acid is from about 1.25:1 to about 1.75:1, from about 1.3:1 to about 1.75:1, from about 1.4:1 to about 1.75:1, from about 1.2:1 to about 1.6:1, from about 1.25:1 to about 1.6:1, from about 1.3:1 to about 1.6:1, from about 1.4:1 to about 1.6:1, from about 1.2:1 to about 1.5:1, from about 1.25:1 to about 1.5:1, from about 1.3:1 to about 1.5:1, or from about 1.4:1 to about 1.5:1.

An additional process for preparing a solid herbicidal concentrate composition comprising a glyphosate salt component, auxin herbicide salt component, and a monocarboxylic acid salt involves co-neutralizing the glyphosate acid and auxin herbicide acid. This process generally comprises the steps of:

mixing glyphosate acid, an auxin herbicide acid, a base, and water to form a reaction mass, wherein the amount of base is sufficient to fully neutralize the auxin herbicide acid and neutralize from about 1.2 to about 1.75 of the ionizable acid groups of the glyphosate acid;

reducing the water content of the reaction mass to produce a herbicidal paste;

mixing a monocarboxylic acid salt with the herbicidal paste;

forming the herbicidal paste comprising the glyphosate salt, auxin herbicide salt, and monocarboxylic acid salt to form herbicidal granules; and drying the herbicidal granules to produce the solid herbicidal concentrate composition.

In various embodiments of this process, the amount of base is sufficient to fully neutralize the auxin herbicide acid and neutralize from about 1.25 to about 1.75, from about 1.3 to about 1.75, from about 1.4 to about 1.75, from about 1.2 to about 1.6, from about 1.25 to about 1.6, from about 1.3 to about 1.6, from about 1.4 to about 1.6, from about 1.2 to about 1.5, from about 1.25 to about 1.5, from about 1.3 to about 1.5, or from about 1.4 to about 1.5 of the ionizable acid groups of the glyphosate acid.

Similarly, a process for preparing a solid herbicidal concentrate composition comprising an auxin herbicide salt component, a co-herbicide salt component, and a monocarboxylic acid salt that includes co-neutralization of the auxin acid and the co-herbicide acid comprises the steps of:

mixing an auxin herbicide acid, a co-herbicide acid, a base, and water to form a reaction mass, wherein the co-herbicide acid comprises a first and a second ionizable acid groups and wherein the amount of base is sufficient to fully neutralize the auxin herbicide acid and neutralize from about 1.2 to about 1.75 of the ionizable acid groups of the co-herbicide acid;

reducing the water content of the reaction mass to produce a herbicidal paste;

mixing a monocarboxylic acid salt with the herbicidal paste;

forming the herbicidal paste comprising the auxin herbicide salt, co-herbicide salt, and monocarboxylic acid salt to form herbicidal granules; and drying the herbicidal granules to produce the solid herbicidal concentrate composition.

In various embodiments of this process, the amount of base is sufficient to fully neutralize the auxin herbicide acid and neutralize from about 1.25 to about 1.75, from about 1.3 to about 1.75, from about 1.4 to about 1.75, from about 1.2 to about 1.6, from about 1.25 to about 1.6, from about 1.3 to about 1.6, from about 1.4 to about 1.6, from about 1.2 to about 1.5, from about 1.25 to about 1.5, from about 1.3 to about 1.5, or from about 1.4 to about 1.5 of the ionizable acid groups of the co-herbicide acid.

The base used for neutralization in any of these processes can be the bases corresponding to the salt-forming cations as mentioned herein including, for example, alkali metal and ammonium-containing cations such as potassium, sodium, ammonium, isopropylammonium, monoethanolammonium, diethanolammonium, triethanolammonium, dimethylammonium, diglycolammonium, and mixtures thereof.

Also, as noted, the solid herbicide concentrate composition can further comprise other additives, such as surfactants. Accordingly, in various embodiments, the processes can further comprise mixing a surfactant with (a) the herbicide acid, the base, and the water; (b) the reaction mass; and/or (c) the herbicidal paste.

In these various processes of the present invention, the amount of water added when forming the reaction mass varies, but is generally from about 10% to about 40% by weight of all of the herbicide acid, base, water, and any other additives added to form the reaction mass. The reaction to form the herbicide salts can generate heat, which can cause some evaporation of the water. Accordingly, reducing the water content of the reaction mass to produce a herbicidal paste can be achieved by using the heat of reaction. Additional source of heating may be applied to achieve the desired water content in order to form a herbicide paste. Typically, the water content of the reaction mass is reduced within the range of from about 2% to about 20% by weight or from about 5% to about 15% by weight when forming the herbicidal paste.

In any of the above-described processes, forming the herbicidal paste can comprise extruding the herbicidal paste. After forming (e.g., extrusion), the herbicide granules are typically moist and coherent, but are not sticky and do not agglomerate. At this point the granules can, if desired, be subjected to a rolling or tumbling action, for example in a tumbler or spheronizer, to give them a more rounded shape and to make them more uniform in size.

Finally, the moist granules are dried to further reduce the moisture content to form the solid herbicidal concentrate composition. Known drying methods can be used, but a one specific method is fluid bed drying. In general, the granules are dried to a moisture content below about 5% or about 2.5% by weight. In some embodiments, for example, the granules are preferably dried to a moisture content below about 1%, or below about 0.5% by weight.

After drying, the solid herbicidal concentrate composition can be packaged or held in a hopper or other storage vessel until ready for packaging. Also, the solid herbicidal concentrate compositions described herein can be packaged together or with other solid compositions (i.e., mixture of solids). A dispensing system such as that described in U.S. Patent Application Publication No. 2011/0041952 can be used to prepare these mixtures of solids.

Having described the invention in detail, it will be apparent that modifications and variations are possible without departing from the scope of the invention defined in the appended claims.

EXAMPLES

The following non-limiting examples are provided to further illustrate the present invention.

Example 1: General Procedures for Preparation of Solid Herbicidal Concentrate Compositions The following methods are general procedures for the preparation of solid herbicidal concentrate compositions. The form of glyphosate acid (e.g., wet cake), the form of auxin acid (e.g., wet cake) or an auxin herbicide salt (e.g., salt form), surfactant, fillers (e.g., sodium sulfate and sodium sulfite), anti-foam agent, base, the amount of water, and the temperature can be varied during these preparation processes. The monocarboxylic acid salt used in General Procedure 1.3 can also be varied.

General Procedure 1.1: Preparation of Solid Glyphosate Concentrate Composition

Glyphosate acid (in wet cake form), anti-foam agent, sodium sulfate, and sodium sulfite were mixed in a stainless steel mixing bowl equipped with a planetary mixer to obtain a homogenous mixture (e.g., within about 5 minutes of mixing). While mixing continued, KOH pellets were added into the homogenous mixture. The amount of KOH added to the mixture was calculated based on the degree of glyphosate neutralization/over-neutralization desired.

Mixing continued after the KOH pellets were added. As the reaction proceeded, the temperature of the mixture increased and water was generated. A small amount of water was added periodically to prevent rapid evaporation of the water of reaction and ensure that the mixture was fluidized completely as the peak reaction temperature of 120° C.-130° C. was reached. The amount of additional water required was dependent on the size of the batch and the moisture content in the glyphosate acid. For example, water ranging from 50 g to 100 g was required for a glyphosate acid batch size from about 500 g to about 600 g. The mixture began to cool after completion of the reaction.

Mixing continued as the mixture cooled. When the temperature reached approximately 70° C., a heat gun (with the temperature set at 400° C.) was used to blow hot air over the surface of the mixture to evaporate water and maintain the temperature of the mixture at between 60° C. to 70° C. While drying, the mixture became more viscous. At this point, surfactant was added. The surfactant added was a 60/40 wt. % blend of (1) ARMOHIB 210 (formerly known as WITCAMINE 210), which is a tallow diethylenetriamine amidoamine with an average ethoxylation of 18 and (2) ETHYLAN 68-30, which is a $C_{16-18}$ alkoxylated alcohol with an average ethoxylation of 20. Both of these surfactants are available from Akzo Nobel. These surfactants were melted prior to adding to the mixture. Addition of the surfactant provided for a homogenous mixture while keeping the product molten prior to further hardening. Other surfactants that are liquid at room temperature can be added later in the process. Heat stable liquid surfactants can be added at any point in the process.

As the mixture was drying, it began to take on a paste-like or batter texture. Upon further drying of the paste mixture, it began to crumble into small pieces. At this point, the mixture was removed from the mixer and extruded through a screen (1 mm) to form extruded granules. The extruded granules were then further dried in a fluidized bed dryer at 70° C. to a water content of <1 wt. %.

Alternatively, the KOH neutralization or over-neutralization of the glyphosate acid wet cake may be conducted without other formulation ingredients (e.g., anti-foam agent, sodium sulfate and sodium sulfite, and surfactant). Once completion, the rest of the formulation ingredients was added and mixed into the partially cooled material. The resulting mixed material was dried and extruded as described in detail above.

General Procedure 1.2: Preparation of Solid Glyphosate-Auxin Herbicide Concentrate Composition General Procedure 1.1 was followed except that one or more auxin herbicide acids such as dicamba acid and/or 2,4-D acid were also added to the mixing bowl with the glyphosate acid (in wet cake form), anti-foam agent, sodium sulfate, and sodium sulfite. Additional base (KOH) was added to ensure complete neutralization of the auxin herbicide acid(s).

General Procedure 1.3: Preparation of Solid Concentrate Compositions Comprising a Monocarboxylic Acid Salt General Procedure 1.1 and 1.2 were followed except that after addition of the surfactant, a monocarboxylic acid salt (e.g., sodium acetate) was added to the paste mixture (i.e., before drying and extrusion).

Example 2: Solid Potassium Glyphosate Concentrate Compositions

The solid glyphosate concentrate compositions (1 mm extruded granules) listed in Table 1 were prepared by in accordance with General Procedure 1.1.

TABLE 1

| Compositions-1, 2, and 3 | | | | | | |
|---|---|---|---|---|---|---|
| | Composition-1 | | Composition-2 | | Composition-3 | |
| | $K^+$:total glyphosate anions | | | | | |
| | 1:1 | | 1.3:1 | | 1.5:1 | |
| Ingredients | Wt. % | A.E. % | Wt. % | A.E. % | Wt. % | A.E. % |
| K-glyphosate | 84.10 | 68.31 | 84.65 | 65.09 | 84.10 | 62.44 |
| Surfactant | 11.40 | — | 10.85 | — | 11.40 | — |
| Sodium Sulfate | 4.00 | — | 4.00 | — | 4.00 | — |
| Sodium Sulfite | 0.40 | — | 0.40 | — | 0.40 | — |
| Anti-foam | 0.10 | — | 0.10 | — | 0.10 | — |
| Total | 100.00 | | 100.00 | | 100.00 | |

Example 3: Solid Potassium Glyphosate Concentrate Compositions Comprising a Monocarboxylic Acid Salt The solid glyphosate concentrate compositions comprising sodium acetate (1 mm extruded granules) listed in Table 2 were prepared in accordance with General Procedures 1.1 and 1.3. Sodium acetate was added into the paste mixture before drying and extrusion.

TABLE 2

| Compositions-4, 5, and 6 | | | | | | |
|---|---|---|---|---|---|---|
| | Composition-4 | | Composition-5 | | Composition-6 | |
| | $K^+$:total glyphosate anions | | | | | |
| | 1:1 | | 1.3:1 | | 1.3:1 | |
| Ingredients | Wt. % | A.E. % | Wt. % | A.E. % | Wt. % | A.E. % |
| K-glyphosate | 84.10 | 68.31 | 84.65 | 65.09 | 84.65 | 65.09 |
| Surfactant | 11.40 | — | 10.85 | — | 10.85 | — |
| Sodium Sulfate | 2.00 | — | 2.00 | — | 0.00 | — |
| Sodium Sulfite | 0.40 | — | 0.40 | — | 0.40 | — |
| Anti-foam | 0.10 | — | 0.10 | — | 0.10 | — |
| Sodium Acetate[a] | 2.00 | — | 2.00 | — | 4.00 | — |
| Total | 100.00 | | 100.00 | | 100.00 | |

[a]The amount of sodium acetate added during the process.

Example 4: Retention of Acetate/Acetic Acid in Solid Potassium Glyphosate Concentrate Compositions The total acetate content in the solid concentrate compositions of Example 3 (e.g., Composition-4, Composition-5, and Composition-6) was measured by an industry standard acetate content high-performance liquid chromatography (HPLC) method, known in the art. The total acetate content, as measured by HPLC, accounted for both acetic acid and/or acetate. The retained (%) of acetic acid and/or acetate is calculated by the formula of (measured acetate content in final concentrate composition/measured acetate content added during the process)×100%. The results are presented in Table 3. Composition-5 and Composition-6 retained approximately 30% of the acetate added. In these compositions, the ratio of K$^+$ to the total glyphosate anions was 1.3:1.

TABLE 3

Acetate Content in Compositions

| | Composition-4 | Composition-5 | Composition-6 |
|---|---|---|---|
| | K$^+$:total glyphosate anions | | |
| | 1:1 | 1.3:1 | 1.3:1 |
| Acetate added during the process | | | |
| NaOAc Added (wt. %) | 2.00 | 2.00 | 4.00 |
| Measured (wt. %) | 1.46 | 1.46 | 2.92 |
| Acetate in Final Composition | | | |
| Measured (wt. %) | ND$^a$ | 0.45 | 0.88 |
| Retained (%) | — | 30.82 | 30.14 |

$^a$the concentrations of acetic acid and/or acetate were below the limits of detection.

Example 5: General Procedure for Measurement of Auxin Herbicide Volatility

Volatility of an auxin herbicide from an application solution is measured in accordance with the procedure described in "A Method to Determine the Relative Volatility of Auxin Herbicide Formulations" in ASTM publication STP1587 entitled "Pesticide Formulation and Delivery Systems: 35th Volume, Pesticide Formulations, Adjuvants, and Spray Characterization in 2014, published 2016, which is incorporated herein by reference. The general procedure is described briefly below.

Humidomes obtained from Hummert International (Part Nos 14-3850-2 for humidomes and 11-3050-1 for 1020 flat tray) were modified by cutting a 2.2 cm diameter hole on one end approximately 5 cm from the top to allow for insertion of a glass air sampling tube (22 mm OD) containing a polyurethane foam (PUF) filter. The sampling tube was secured with a VITON o-ring on each side of the humidome wall. The air sampling tube external to the humidome was fitted with tubing that was connected to a vacuum manifold immediately prior to sampling.

The flat tray beneath the humidome was filled with 1 liter of sifted dry or wet 50/50 soil (50% Redi-Earth and 50% US 10 Field Soil) to a depth of about 1 cm. Spray solutions of each formulation were prepared to contain 1.2% a.e. of total auxin herbicide, which is equivalent to an application rate of 1.0 lb/A a.e. at 10 gallons per acre (GPA), and then sprayed onto the soil of each humidome. Four separate humidome boxes were sprayed to have four replicate measurements for each formulation.

The flat tray bottom containing the auxin herbicide formulation on soil was covered with the humidome lid and the lid was secured with clamps. The growth chambers were set at 35° C. and 40% relative humidity (RH). The assembled humidomes were placed in a temperature and humidity controlled environment and connected to a vacuum manifold through the air sampling line. Air was drawn through the humidome and PUF at a rate of 2 liters per minute (LPM) for 24 hours at which point the air sampling was stopped. The humidomes were then removed from the controlled environment and the PUF filter was removed. The PUF filter was extracted with 20 mL of methanol and the solution was analyzed for the auxin herbicide concentration using LC-MS methods known in the art.

Example 6: Measurement of Dicamba Volatility from Tank Mixed Formulations Prepared with Solid Potassium Glyphosate Concentrate Compositions The herbicidal application mixtures (tank mixes) listed in Tables 4-1 and 4-2 were prepared using CLARITY (DGA salt of dicamba from BASF), Roundup POWERMAX) (potassium glyphosate from Monsanto), a mixture of CLARITY with sodium acetate/acetic acid (referred to as "CLARITY/acetate premix"), and the solid concentrate compositions prepared in Examples 2 and 3. The application mixtures were prepared by mixing the components with water to the herbicide concentrations noted in the tables below.

The dicamba volatility from each application mixture was measured by the method described in Example 5. Tables 4-1 and 4-2 below provide the mean concentration of dicamba in air for these mixtures.

A pH measurement is also provided for each application mixture. The pH measurements were obtained by immersing the probe of a calibrated pH meter into each application mixture and recording the digital reading. The pH measurements were made using a Mettler Toledo model SevenEasy pH meter with a Thermo Scientific ROSS Sure-flow pH probe. The pH meter was calibrated in accordance with the manufacturer's recommended protocol at pH 4 and pH 7 using standard buffer solutions.

TABLE 4-1

Dicamba Volatility of Tank Mixed Formulations (1)

| Formulation No. | Ingredients | pH | Volatility (ng/L) | Std Dev | Std Err |
|---|---|---|---|---|---|
| Comparative-1 | 1.2% a.e. CLARITY + 2.4% a.e. POWERMAX | 4.35 | 2.577 | 0.381 | 0.191 |
| Comparative-2 | 1.2% a.e. CLARITY/acetate premix + 2.4% a.e. POWERMAX | 4.65 | 0.670 | 0.300 | 0.150 |
| Dicamba + Composition-1 | 1.2% a.e. CLARITY + 2.4% a.e. K-Glyphosate (1:1) | 4.17 | 3.938 | 0.122 | 0.070 |
| Dicamba + Composition-2 | 1.2% a.e. CLARITY + 2.4% a.e. K-Glyphosate (1.3:1) | 5.11 | 0.563 | 0.094 | 0.047 |
| Dicamba + Composition-3 | 1.2% a.e. CLARITY + 2.4% a.e. K-Glyphosate (1.5:1) | 5.53 | 0.200 | 0.018 | 0.011 |

TABLE 4-2

Dicamba Volatility of Tank Mixed Formulations (2)

| Formulation No. | Ingredients | pH | Acetate Retained (wt. %) | Volatility (ng/L) | Std Dev | Std Err |
|---|---|---|---|---|---|---|
| Comparative-1 | 1.2% a.e. CLARITY + 2.4% a.e. POWERMAX | 4.38 | NA | 2.084 | 1.049 | 0.606 |
| Comparative-2 | 1.2% a.e. CLARITY/acetate premix + 2.4% a.e. POWERMAX | 4.66 | NM[b] | 0.698 | 0.316 | 0.183 |
| Dicamba + Composition-1 | 1.2% a.e. CLARITY + 2.4% a.e. K-Glyphosate (1:1) | 4.19 | NA | 1.685 | 0.555 | 0.320 |
| Dicamba + Composition-2 | 1.2% a.e. CLARITY + 2.4% a.e. K-Glyphosate (1.3:1) | 5.20 | NA | 0.304 | 0.169 | 0.098 |
| Dicamba + Composition-4 | 1.2% a.e. CLARITY + 2.4% a.e. K-Glyphosate (1:1) + NaOAc (1x)[a] | 4.38 | ND[c] | 1.511 | 0.308 | 0.178 |
| Dicamba + Composition-5 | 1.2% a.e. CLARITY + 2.4% a.e. K-Glyphosate (1.3:1) + NaOAc (1x)[a] | 5.19 | 0.45 | 0.522 | 0.05 | 0.03 |
| Dicamba + Composition-6 | 1.2% a.e. CLARITY + 2.4% a.e. K-Glyphosate (1.3:1) + NaOAc (2x)[a] | 5.14 | 0.88 | 0.378 | 0.147 | 0.085 |

[a] NaOAc (1x) and NaOAc (2x) were 2.00 wt. % and 4.00 wt. %, added into the composition mixture during the process, respectively.
[b] the concentrations of acetic acid and/or acetate were not measured.
[c] the concentrations of acetic acid and/or acetate were below the limits of detection.

Example 7: Solid Potassium Glyphosate-Dicamba Premix Concentrate Compositions The solid glyphosate-dicamba premix concentrate composition (1 mm extruded granules) listed in Table 5 was prepared in accordance with General Procedure 1.2. The dicamba acid was fully neutralized with KOH. A sufficient amount of additional KOH was added such that the molar ratio of KOH to total glyphosate anions in the potassium glyphosate component was 1.3:1 (i.e., to prepare the 1.3 potassium glyphosate salt).

TABLE 5

Composition-7

| | Composition-7 K+:total glyphosate anions[a] 1.3:1 | |
|---|---|---|
| Ingredients | Wt. % | A.E. % |
| K-glyphosate | 59.18 | 45.50 |
| K-dicamba | 26.77 | 22.75 |
| Surfactant | 7.58 | — |
| Sodium Sulfate | 5.97 | — |
| Sodium Sulfite | 0.40 | — |
| Anti-foam | 0.10 | — |
| Total | 100.00 | 68.25 |

[a] the molar ratio of K+:total glyphosate anions in the potassium glyphosate component.

Example 8: Solid Potassium Glyphosate-Dicamba Premix Concentrate Compositions Comprising a Monocarboxylic Acid Salt The solid glyphosate-dicamba premix concentrate compositions comprising sodium acetate (1 mm extruded granules) were prepared by the single vessel neutralization of glyphosate and dicamba acids, formulation process, and sodium acetate addition in accordance with General Procedure 1.3. The dicamba acid was fully neutralized with KOH. A sufficient amount of additional KOH was added such that the molar ratio of KOH to total glyphosate anions in the potassium glyphosate component was either 1:1 or 1.3:1 (i.e., to prepare the monopotassium glyphosate salt or the 1.3 potassium glyphosate salt). Sodium acetate was directly added into the paste mixture before drying and extrusion. The compositions are presented in Table 6.

TABLE 6

Composition-8, 9, and 10

| | Composition-8 | | Composition-10 | |
|---|---|---|---|---|
| | K+:total glyphosate anions[a] | | | |
| | 1:1 | | 1.3:1 | |
| Ingredients | Wt. % | A.E. % | Wt. % | A.E. % |
| K-glyphosate | 56.02 | 45.50 | 59.18 | 45.50 |
| K-dicamba | 26.77 | 22.75 | 26.77 | 22.75 |
| Surfactant | 7.58 | — | 7.58 | — |
| Sodium Sulfate | 3.15 | — | 0.00 | — |
| Sodium Sulfite | 0.40 | — | 0.40 | — |
| Antifoam | 0.10 | — | 0.10 | — |
| Sodium Acetate[b] | 5.97 | — | 5.97 | — |
| Total | 100.00 | 68.25 | 100.00 | 68.25 |

[a] the ratio of K+:total glyphosate anions in the potassium glyphosate component.
[b] The amount of sodium acetate was directly added into the mixture paste before drying and extrusion.

Example 9: Retention of Acetate/Acetic Acid in Solid Potassium Glyphosate-Dicamba Premix Concentrate Compositions As both the neutralization level and temperature of the process may cause acetic acid to volatilize, the acetate content in the finished solid compositions of Example 8 (e.g., Composition-8, and Composition-10) was measured by a HPLC method as described in Example 4. The total acetate content, measured by the HPLC method, may present in the form of acetic acid and/or acetate. The results are presented in Table 7. Composition-8 provided the finished product containing an approximately 51% retained acetate, where the ratio of $K^+$ to the total glyphosate anions in the potassium glyphosate component of compositions was 1:1. Composition 10 provided the finished product containing an approximately 60% retained acetate where the ratio of $K^+$ to the total glyphosate anions in the potassium glyphosate component of compositions was 1.3:1.

TABLE 7

Acetate Content in Compositions

|  | Composition-8 | Composition-10 |
|---|---|---|
|  | $K^+$:total glyphosate anions[a] | |
|  | 1:1 | 1.3:1 |
| during the process | | |
| NaOAc Added (wt. %) | 5.97 | 5.97 |
| Measured[b] (wt. %) | 4.36 | 4.36 |
| Finished Product | | |
| Measured[a] (wt. %) | 2.24 | 2.61 |
| Retained (%)[c] | 51.37 | 59.86 |

[a] the ratio of $K^+$:total glyphosate anions in the potassium glyphosate component.
[b] Total acetate content in the form of acetic acid and/or acetate, measured by the HPLC.
d: Retained (%) of acetic acid and/or acetate is calculated by a formula of (measured acetate content in finished product/measured acetate content added during the process).

Example 10: Measurement of Dicamba Volatility from Application Mixtures Prepared Using Solid Potassium Glyphosate-Dicamba Premix Concentrate Compositions The comparative formulations listed in Table 6 were prepared using CLARITY (DGA salt of dicamba from BASF), Roundup POWERMAX) (potassium glyphosate from Monsanto), or a mixture of CLARITY with sodium acetate/acetic acid (referred to as "CLARITY/acetate premix") by adding each specified herbicide to water and mixing. The solid concentrate composition (Composition-7 as prepared in Example 7) was mixed with water to obtain the desired herbicide concentrations (% a.e.). The dicamba volatility of each formulation was measured by the method described in Example 5. Table 8 below provides the mean concentration of dicamba in air for the tested formulations.

A pH measurement is also provided for each formulation. The pH measurements were obtained using the procedure described in Example 6.

TABLE 8

Dicamba Volatility of Premix Formulations

| Formulation No. | Ingredients | pH | Acetate Retained (wt. %) | Volatility (ng/L) | Std Dev | Std Err |
|---|---|---|---|---|---|---|
| Comparative-1 | 1.2% a.e. CLARITY + 2.4% a.e. POWERMAX | 4.37 | NA | 1.180 | 0.173 | 0.087 |
| Comparative-2 | 1.2% a.e. CLARITY/acetate premix + 2.4% a.e. POWERMAX | 4.68 | NM[a] | 0.399 | 0.067 | 0.034 |
| Composition-7 | 1.2% ae K-Dicamba + 2.4% ae K-Glyphosate (1.3:1) | 5.10 | NA | 0.673 | 0.044 | 0.025 |

[a] the concentrations of acetic acid and/or acetate were not measured.

Example 11: Solid Potassium Glyphosate-Auxin(s) Premix Concentrate Compositions

Solid herbicidal premix concentrate compositions (1 mm extruded granules) were prepared in accordance with General Procedure 1.2. The compositions are presented in Table 9. Composition 11 contains glyphosate and 2,4-D while Composition 12 contains glyphosate, 2,4-D and dicamba. In these compositions, the 2,4-D and dicamba acids were fully neutralized with KOH. A sufficient amount of additional KOH was added such that the molar ratio of KOH to total glyphosate anions in the potassium glyphosate component was 1.3:1 (i.e., to prepare the 1.3 potassium glyphosate salt).

TABLE 9

Compositions-11 and 12

|  | Composition-11 $K^+$:total glyphosate anions[a] 1.3:1 | | Composition-12 $K^+$:total glyphosate anions[a] 1.3:1 | |
|---|---|---|---|---|
| Ingredients | Wt. % | A.E. % | Wt. % | A.E. % |
| K-glyphosate | 59.18 | 45.50 | 59.18 | 45.50 |
| K-Dicamba | — | — | 13.39 | 11.38 |
| K-2,4-D | 26.77 | 22.75 | 13.39 | 11.38 |
| Surfactant | 7.58 | — | 7.58 | — |
| Sodium Sulfate | 5.97 | — | 5.97 | — |
| Sodium Sulfite | 0.40 | — | 0.40 | — |
| Anti-foam | 0.10 | — | 0.10 | — |
| Total | 100.00 | 68.25 | 100.00 | 68.25 |

[a] the molar ratio of $K^+$:total glyphosate anions in the potassium glyphosate component.

Example 12: Solid Potassium Glyphosate-Auxin(s) Premix Concentrate Compositions Comprising a Monocarboxylic Acid Salt Solid herbicidal premix concentrate compositions (1 mm extruded granules) were prepared in accordance with General Procedures 1.2 and 1.3. The compositions are presented in Table 10. Composition 13 contains glyphosate and 2,4-D while Composition 14 contains glyphosate, 2,4-D and dicamba. In these compositions, the 2,4-D and dicamba acids were fully neutralized with KOH. A sufficient amount of additional KOH was added such that the molar ratio of KOH to total glyphosate anions in the potassium glyphosate component was 1.3:1 (i.e., to prepare the 1.3 potassium glyphosate salt). Sodium acetate was added into the mixtures before drying and extrusion.

TABLE 10

Compositions-13 and 14

| | Composition-13 | | Composition-14 | |
|---|---|---|---|---|
| | $K^+$:total glyphosate anions[a] 1.3:1 | | $K^+$:total glyphosate anions[a] 1.3:1 | |
| Ingredients | Wt. % | A.E. % | Wt. % | A.E. % |
| K-glyphosate | 59.18 | 45.50 | 59.18 | 45.50 |
| K-Dicamba | — | — | 13.39 | 11.38 |
| K-2,4-D | 26.77 | 22.75 | 13.39 | 11.38 |
| Surfactant | 7.58 | — | 7.58 | — |
| Sodium Sulfate | — | — | — | — |
| Sodium Sulfite | 0.40 | — | 0.40 | — |
| Anti-foam | 0.10 | — | 0.10 | — |
| Sodium Acetate[b] | 5.97 | — | 5.97 | — |
| Total | 100.00 | 68.25 | 100.00 | 68.25 |

[a] the molar ratio of $K^+$:total glyphosate anions in the potassium glyphosate component.
[b] The amount of sodium acetate added during the process.

Example 13: Measurement of Herbicidal Effectiveness of Solid Concentrate Compositions (Green House)

The herbicidal effectiveness of the compositions prepared in the preceding Examples was assessed through conventional greenhouse tests. Herbicidal effectiveness was measured as a percentage "control" following a standard procedure in the art which reflects a visual assessment of plant mortality and growth reduction by comparison with untreated plants, made by technicians specially trained to make and record such observations. In all cases, a single technician makes all assessments of percent inhibition within any one experiment or trial. Such measurements are relied upon and regularly reported by Monsanto Company in the course of its herbicide business, as well as by the agricultural industry and academic community.

The herbicidal application mixtures listed in the tables below were prepared using the compositions described in the preceding Examples. XTENDIMAX® (DGA dicamba from Monsanto) was tank mixed with selected compositions as indicated.

Weed seeds were planted in 3.5 in square plastic pots filled with Redi-earth (Sun Gro, Bellevue, Wash.) containing 100 g/cu ft Osmocote 14-14-14 slow release fertilizer. Ten to fifteen weed seeds were planted about one-half inch deep and loosely covered with Redi-Earth potting media. The pots were placed in a controlled environment equipped with sub-irrigation. Growth conditions were 27° C. day and 21° C. night with fourteen hours of supplemental light (approximately 600 microeinsteins). After germination and emergence from the potting media, the plants were thinned to achieve one plant per pot. Pots that contained plants that were similar in appearance, size, and vigor were selected for treatment. Typically, the plants were four to eight inches tall at the time of herbicide treatment. Compositions were applied to the plants with a track sprayer generally using a Teejet 9501E flat fan nozzle or similar nozzle with air pressure set at a minimum of 24 pounds per square inch. The spray nozzle is 16 inches above the top of the plants and a spray volume rate of approximately 10 gallons per acre (93 L per hectare) was applied. Weed control of the compositions to ABUTH (Velvetleaf) and ELFIN (Goosegrass) in the greenhouse tests was evaluated 21 days after treatment (21 DAT). The results are presented in Tables 11-13.

TABLE 11

Herbicidal Efficacy of Tank Mixtures Containing XTENDIMAX ® and K-glyphosate on ABUTH (velvetleaf) and ELEIN (goosegrass)

| | Amount | Rate | % CONTROL (21 DAT) | |
|---|---|---|---|---|
| Composition | % a.e. | g a.e./ha | ABUTH | ELEIN |
| Composition-1 + | 62.2 | 280 | 68.3 | 30.0 |
| XtendiMax ® | 29 | 140 | | |
| Composition-1 + | 62.2 | 560 | 83.3 | 78.3 |
| XtendiMax ® | 29 | 280 | | |
| Composition-1 + | 62.2 | 1120 | 93.8 | 80.0 |
| XtendiMax ® | 29 | 560 | | |
| Composition-2 + | 60.6 | 280 | 41.7 | 27.5 |
| XtendiMax ® | 29 | 140 | | |
| Composition-2 + | 60.6 | 560 | 82.5 | 77.5 |
| XtendiMax ® | 29 | 280 | | |
| Composition-2 + | 60.6 | 1120 | 90.8 | 80.0 |
| XtendiMax ® | 29 | 560 | | |
| Composition-3 + | 57.3 | 280 | 65.8 | 50.0 |
| XtendiMax | 29 | 140 | | |
| Composition-3 + | 57.3 | 560 | 84.2 | 76.7 |
| XtendiMax ® | 29 | 280 | | |
| Composition-3 + | 57.3 | 1120 | 99.8 | 80.0 |
| XtendiMax ® | 29 | 560 | | |
| Composition-4 + | 67.6 | 280 | 73.3 | 20.8 |
| XtendiMax ® | 29 | 140 | | |
| Composition-4 + | 67.6 | 560 | 90.8 | 79.2 |
| XtendiMax ® | 29 | 280 | | |
| Composition-4 + | 67.6 | 1120 | 99.7 | 81.7 |
| XtendiMax ® | 29 | 560 | | |
| Composition-5 + | 61.6 | 280 | 55.0 | 30.0 |
| XtendiMax ® | 29 | 140 | | |
| Composition-5 + | 61.6 | 560 | 87.5 | 78.3 |
| XtendiMax ® | 29 | 280 | | |
| Composition-5 + | 61.6 | 1120 | 94.2 | 80.0 |
| XtendiMax ® | 29 | 560 | | |
| Composition-6 + | 63.3 | 280 | 60.8 | 25.0 |
| XtendiMax ® | 29 | 140 | | |
| Composition-6 + | 63.3 | 560 | 88.3 | 75.0 |
| XtendiMax ® | 29 | 280 | | |
| Composition-6 + | 63.3 | 1120 | 99.2 | 81.7 |
| XtendiMax ® | 29 | 560 | | |
| UNTREATED | 0 | 0 | 0.0 | 0.0 |

TABLE 12

Herbicidal Efficacy of K-glyphosate/K-dicamba Premixes on ABUTH (velvetleaf) and ELEIN (goosegrass)

| | Amount | Rate | % CONTROL (21 DAT) | |
|---|---|---|---|---|
| Composition | % a.e. | g a.e./ha | ABUTH | ELEIN |
| Composition-7 | 43.9 | 280 | 54.2 | 43.3 |
| Composition-7 | 43.9 | 560 | 85.8 | 78.3 |
| Composition-7 | 43.9 | 1120 | 98.3 | 80.0 |
| Composition-8 | 47.3 | 280 | 65.0 | 29.2 |
| Composition-8 | 47.3 | 560 | 85.8 | 75.0 |
| Composition-8 | 47.3 | 1120 | 97.3 | 80.0 |
| Composition-10 | 43.2 | 560 | 82.5 | 79.2 |
| Composition-10 | 43.2 | 1120 | 98.0 | 80.0 |
| UNTREATED | 0 | 0 | 0.0 | 0.0 |

TABLE 13

Herbicidal Efficacy of Potassium Glyphosate/Potassium-2,4-D
Premixes/Potassium Dicamba Premixes and Tank Mixtures Containing
XTENDIMAX ® on ABUTH (velvetleaf) and ELEIN (goosegrass)

| Composition | Amount % a.e. | Rate g a.e./ha | % CONTROL (21 DAT) ABUTH | ELEIN |
|---|---|---|---|---|
| Composition-11 + | 42.9 | 280 | 71.7 | 21.7 |
| XtendiMax ® | 29 | 140 | | |
| Composition-11 + | 42.9 | 560 | 85.0 | 65.8 |
| XtendiMax ® | 29 | 280 | | |
| Composition-11 + | 42.9 | 1120 | 100.0 | 80.0 |
| XtendiMax ® | 29 | 560 | | |
| Composition-12 | 43.3 | 280 | 35.0 | 23.3 |
| Composition-12 | 43.3 | 560 | 81.7 | 65.8 |
| Composition-12 | 43.3 | 1120 | 89.2 | 80.0 |
| Composition-13 + | 42.6 | 280 | 66.7 | 34.2 |
| XtendiMax ® | 29 | 140 | | |
| Composition-13 + | 42.6 | 560 | 86.7 | 60.8 |
| XtendiMax ® | 29 | 280 | | |
| Composition-13 + | 42.6 | 1120 | 98.8 | 81.7 |
| XtendiMax ® | 29 | 560 | | |
| Composition-14 | 43.3 | 280 | 30.8 | 30.8 |
| Composition-14 | 43.3 | 560 | 84.2 | 77.5 |
| Composition-14 | 43.3 | 1120 | 94.0 | 80.0 |
| UNTREATED CHECK | 0 | 0 | 0.0 | 0.0 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description shall be interpreted as illustrative and not in a limiting sense.

What is claimed is:

1. A solid herbicidal concentrate composition comprising a glyphosate salt component and a monocarboxylic acid salt,
    wherein the glyphosate salt component comprises glyphosate anions and a monovalent salt-forming cation,
    wherein the molar ratio of the monovalent salt-forming cation to total glyphosate anions is from about 1.2:1 to about 1.75:1, and the glyphosate salt component concentration on an acid equivalent basis is at least about 20 wt. %, and
    wherein the monocarboxylic acid salt has the formula $R^1$—C(O)OM, wherein $R^1$ is substituted or unsubstituted $C_1$-$C_5$ alkyl or substituted or unsubstituted $C_2$-$C_5$ alkenyl and M is an agriculturally acceptable cation.

2. The solid herbicidal concentrate composition of claim 1 wherein the molar ratio of the monovalent salt-forming cation to total glyphosate anions is from about 1.25:1 to about 1.6:1.

3. The solid herbicidal concentrate composition of claim 1 wherein the monovalent salt-forming cation of the glyphosate salt component is selected from the group consisting of potassium, sodium, ammonium, isopropylammonium, monoethanolammonium, diethanolammonium, triethanolammonium, dimethylammonium, and mixtures thereof.

4. The solid herbicidal concentrate composition of claim 1 wherein the monovalent salt-forming cation of the glyphosate salt component consists essentially of potassium.

5. The solid herbicidal concentrate composition of claim 1 wherein the composition contains no more than about 1 wt. % of ammonium and/or diammonium glyphosate salts.

6. The solid herbicidal concentrate composition of claim 1 wherein the glyphosate salt component concentration on an acid equivalent basis is from about 20 wt. % to about 80 wt. %.

7. The solid herbicidal concentrate composition of claim 1 wherein M is an alkali metal cation selected from the group consisting of sodium, potassium, and mixtures thereof.

8. The solid herbicidal concentrate composition of claim 1 wherein the monocarboxylic acid salt comprises a salt-forming cation that is the same as the monovalent salt-forming cation of the glyphosate salt component.

9. The solid herbicidal concentrate composition of claim 7 wherein the monocarboxylic acid salt comprises a salt of an acid selected from the group consisting of formic acid, acetic acid, propionic acid, and mixtures thereof.

10. The solid herbicidal concentrate composition of claim 1 wherein the monocarboxylic acid salt comprises sodium acetate and/or potassium acetate.

11. The solid herbicidal concentrate composition of claim 1, wherein the concentration of the monocarboxylic acid salt is from about 0.25 wt. % to about 10 wt. % and further comprises an auxin herbicide salt component wherein the auxin herbicide salt component comprises a salt of one or more auxin herbicides selected from the group consisting of 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy) butanoic acid (MCPB); 4-chlorophenoxyacetic acid; 2,4,5-trichlorophenoxyacetic acid (2,4,5-T); mecoprop; and mixtures thereof.

12. The solid herbicidal concentrate composition of claim 11 wherein the auxin herbicide salt component comprises a dicamba salt.

13. The solid herbicidal concentrate composition of claim 12 wherein the dicamba salt is selected from the group consisting of the sodium salt of dicamba, the potassium salt of dicamba, the monoethanolamine salt of dicamba, the diglycolamine salt of dicamba, the dimethylamine salt of dicamba, and combinations thereof.

14. The solid herbicidal concentrate composition of claim 11 wherein the auxin herbicide salt component concentration on an acid equivalent basis is from about 10 wt. % to about 60 wt. %.

15. The solid herbicidal concentrate composition of claim 11 wherein the weight ratio of the glyphosate salt component to the auxin herbicide salt component on an acid equivalent basis is from about 5:1 to about 1:10.

16. The solid herbicidal concentrate composition of claim 1, further comprising an additive comprising sulfate ions and/or sulfite ions.

17. A solid herbicidal concentrate composition comprising:
    an auxin herbicide salt component comprising an auxin herbicide selected from the group consisting of 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5-trichlorophenoxyacetic acid (2,4,5-T); mecoprop; and mixtures thereof, a co-herbicide salt component comprising glyphosate or glufosinate, and a monocarboxylic acid salt, wherein the monocarboxvlic acid salt has the formula $R^1$—C(O)OM, wherein $R^1$ is substituted or unsubstituted $C_1$-$C_5$ alkyl or substituted or unsubstituted $C_2$-$C_5$ alkenyl and M is an agriculturally acceptable cation, wherein the co-herbicide salt component comprises one or more acidic co-herbicides comprising a first and a second ionizable acid groups and a monovalent salt-forming cation, wherein the molar ratio of the monovalent salt-forming cation to the first ionizable acid group is at least about 1.1:1, and wherein the auxin herbicide salt component concentration on an acid equivalent basis is at least about 10 wt. %.

18. A process for preparing a solid herbicidal concentrate composition of claim 17, the process comprising:

mixing a co-herbicide acid, a base, and water to form a reaction mass comprising the co-herbicide salt, wherein the co-herbicide acid comprises a first and a second ionizable acid groups, the base comprises the monovalent salt-forming cation, and the molar ratio of the monovalent salt-forming cation to the first ionizable acid group is at least about 1.1:1;

reducing the water content of the reaction mass to produce a herbicidal paste;

mixing the monocarboxylic acid salt and the auxin herbicide salt with the herbicidal paste;

forming the herbicidal paste comprising the co-herbicide salt, monocarboxylic acid salt and auxin herbicide salt to form herbicidal granules; and drying the herbicidal granules to produce the solid herbicidal concentrate composition.

19. A method of preparing an aqueous herbicidal mixture, the method comprising mixing the solid herbicidal concentrate composition of claim 1 with water.

20. A method of preparing an aqueous herbicidal mixture, the method comprising mixing the solid herbicidal concentrate composition of claim 1 with an auxin herbicide salt and water.

21. A process for preparing a solid herbicidal concentrate composition of claim 1, the process comprising:

mixing glyphosate acid, a base, and water to form a reaction mass, wherein the base comprises a monovalent salt-forming cation and the molar ratio of the monovalent salt-forming cation to glyphosate acid in the reaction mass is from about 1.2 to about 1.75, reducing the water content of the reaction mass to produce a herbicidal paste;

mixing the monocarboxylic acid salt with the herbicidal paste;

forming the herbicidal paste comprising the glyphosate salt and monocarboxylic acid salt to form herbicidal granules; and drying the herbicidal granules to produce the solid herbicidal concentrate composition.

22. A process for preparing a solid herbicidal concentrate composition of claim 11, the process comprising:

mixing glyphosate acid, an auxin herbicide acid, a base, and water to form a reaction mass, wherein the amount of base is sufficient to fully neutralize the auxin herbicide acid and neutralize from about 1.2 to about 1.75 of the ionizable acid groups of the glyphosate acid;

reducing the water content of the reaction mass to produce a herbicidal paste;

mixing the monocarboxylic acid salt with the herbicidal paste;

forming the herbicidal paste comprising the glyphosate salt, auxin herbicide salt, and monocarboxylic acid salt to form herbicidal granules; and drying the herbicidal granules to produce the solid herbicidal concentrate composition.

23. A process for preparing a solid herbicidal concentrate composition, the process comprising:

mixing an auxin herbicide acid, a co-herbicide acid, a base, and water to form a reaction mass, wherein the co-herbicide acid comprises a first and a second ionizable acid groups and wherein the amount of base is sufficient to fully neutralize the auxin herbicide acid and neutralize from about 1.2 to about 1.75 of the ionizable acid groups of the co-herbicide acid;

reducing the water content of the reaction mass to produce a herbicidal paste;

mixing a monocarboxylic acid salt with the herbicidal paste;

forming the herbicidal paste comprising the auxin herbicide salt, co-herbicide salt, and monocarboxylic acid salt to form herbicidal granules; and drying the herbicidal granules to produce the solid herbicidal concentrate composition, wherein the auxin herbicide salt component comprises an auxin herbicide selected from the group consisting of 3,6-dichloro-2-methoxybenzoic acid (dicamba); 2,4-dichlorophenoxyacetic acid (2,4-D); 4-(2,4-dichlorophenoxy)butyric acid (2,4-DB); dichloroprop; 2-methyl-4-chlorophenoxyacetic acid (MCPA); 4-(4-chloro-2-methylphenoxy)butanoic acid (MCPB); 4-chlorophenoxyacetic acid; 2,4,5-trichlorophenoxyacetic acid (2,4,5-T); mecoprop; and mixtures thereof, wherein the co-herbicide salt component comprises qlyphosate or glufosinate, and wherein the monocarboxylic acid salt has the formula $R^1$—C(O)OM, wherein $R^1$ is substituted or unsubstituted $C_1$-$C_5$ alkyl or substituted or unsubstituted $C_2$-$C_5$ alkenyl and M is an agriculturally acceptable cation.

* * * * *